Figure 1:
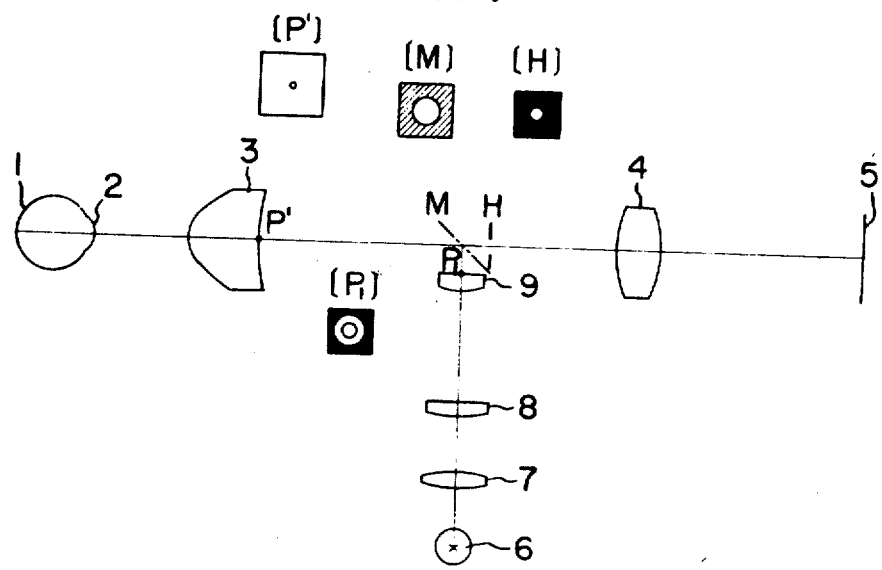

United States Patent

[11] 3,594,071

[72] Inventor Hirokazu Okajima
 Tokyo, Japan
[21] Appl. No. 864,327
[22] Filed Oct. 7, 1969
[45] Patented July 20, 1971
[73] Assignee Nippon Kogaku K.K.
 Tokyo, Japan

[54] OPHTHALMOSCOPIC CAMERA
 2 Claims, 4 Drawing Figs.
[52] U.S. Cl. ................................................ 351/7,
 95/11
[51] Int. Cl. ........................................... A61b 3/14,
 G03b 19/02, A61b 3/10
[50] Field of Search ........................................ 351/7;
 95/11 E, 11 M, 11 BS

[56] References Cited
 UNITED STATES PATENTS
 3,089,398 5/1963 Wilms ....................... 351/7 X 3,259,041 7/1966 Okajima ....................... 351/7 X Primary Examiner—David Schoenberg
Assistant Examiner—Paul A. Sacher
Attorney—Ward, McElhannon, Brooks & Fitzpatrick ABSTRACT: An ophthalmoscopic camera is provided which can eliminate undesired light reflected from the cornea of an eye to be examined and the front and back surfaces of a front objective through which the illumination light passes by interposing a ring-shaped aperture between a plane reflecting mirror and a condenser lens arranged next to the reflecting mirror and a small shield between said condenser lens and the next condenser lens so as to shield a small area in the vicinity of and including the optical axis. The optical system for photography includes no such shield as described above and said photographic objective is of biconvex, thereby increasing the picture angle to 45°.

OPHTHALMOSCOPIC CAMERA

The present invention relates to an ophthalmoscopic camera.

In case of the opthalmoscopic camera of the type in which one portion of the optical system for photography is used in common as one portion of the illumination optical system, the illumination light is reflected by the cornea of an eye to be examined or by other optical components and directed into the optical system for photography, thereby causing flares, ghosts, etc. so that no clear, sharp image of the retina can be obtained.

In order to eliminate such undesired reflected light, there has been proposed a method in which instead of a plane reflecting mirror, a concave reflecting mirror is disposed at an angle relative to the optical axis of the photographic optical system at a point where the light from the illumination optical system enters into the optical axis of the photographic optical system, and another method in which a meniscus-type lens is used as a photo-objective through which the illumination light passes and a small shield is provided in the vicinity of the optical axis of the meniscus lens including the optical axis. In the former method, the aberration is increased because of the inclined concave reflecting mirror so that this method is not suitable for photography of the fundus of an eye to be examined with a high degree of accuracy. In the latter method, the shield must be provided along the optical axis of the photographic optical system so that in some cases, a focused image flight flux corresponding to one point of the retina will be interrupted by this shield when the light flux is too fine as in the case of the ophthalmoscopic camera. Furthermore, it is difficult to increase the picture angle above 30° because of the meniscus lens.

The present invention has for its primary object to eliminate these defects as described above of the conventional ophthalmoscopic camera.

The present invention provides an ophthalmoscopic camera in which a biconvex lens is used as an objective lens of the character described above thereby to increase the angle of view to approximately 45° and the undesired reflected light as described above will be effectively eliminated without providing a shield of the type described above along the optical axis of the photographic optical system.

Figure 2:
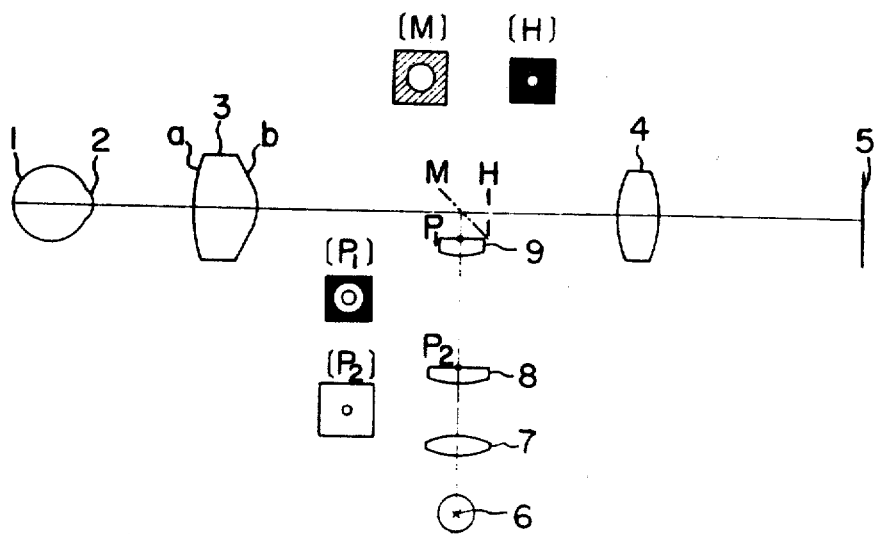
Figure 3:
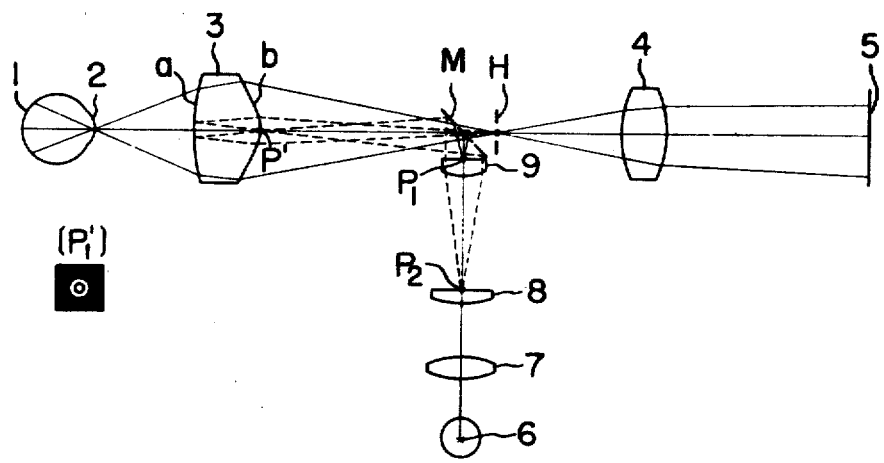
Figure 4:
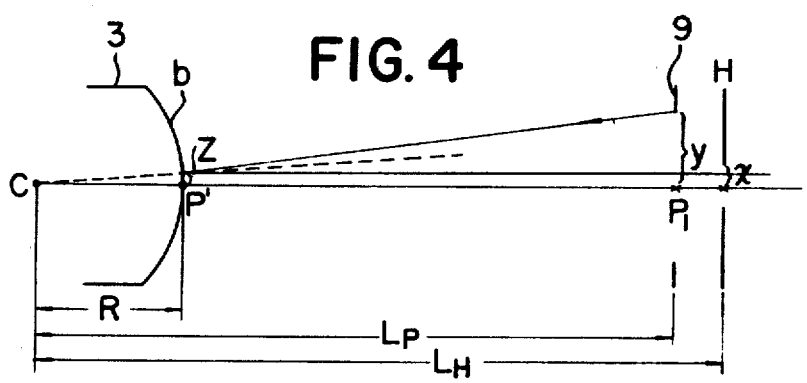
Figure 4:
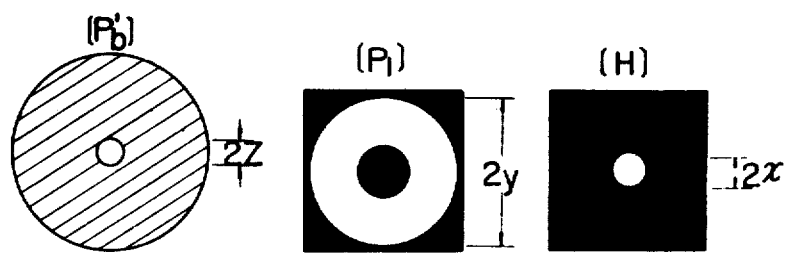

The above and other objects, features and advantages of the present invention will become more apparent from the following description of one embodiment thereof with reference to the accompanying drawing, in which:

FIG. 1 is a diagrammatic view illustrating an optical system of a conventional opthalmoscopic camera provided with means for preventing undesired reflected light; and FIGS. 2, 3, and 4 are diagrammatic views illustrating one embodiment of the present invention, FIG. 2 illustrating the optical system, FIG. 3 being for explanation of the function of the optical system and FIG. 4 being for further explanation of a portion of FIG. 3.

FIG. 1 shows the conventional system above described in which a meniscus type lens 3 is used as a photo-objective through which the illumination light emanated from a light source 6 and passing lenses 7, 8 and 9 passes for illuminating the cornea 2 and fundus 1 to be examined.

FIGS. 2 through 4 show an illustrative embodiment of the present invention.

Referring to FIG. 2, light emanated from a light source 6 and passing through a first condenser lens 7, a second condenser lens 8 and a third condenser lens 9 is reflected by a planar reflecting mirror M which has a centered aperture [M] and is disposed at an angle relative to the optical axis, and is directed along the axis of photographic optical system toward an eye to be examined reaching the fundus 1 through a first objective lens 3 and the cornea 2. (The above is the description of the illumination light.) After illuminating the fundus 1, the light is reflected as "photographic light" which reaches a film 5 through the cornea 2, the first objective lens 3, the center aperture [M] of the planar reflecting mirror M, the aperture [H] of a stop H and a second objective lens 4, thereby focusing the image of the retina. (The above is the description of the light for photography.)

In the optical path of the illumination light, there are three places at which the undesired reflected light is produced, that is, the cornea 2, and the front and back surfaces $a$ and $b$ of the first objective lens 3. In order to prevent the undesired light reflected from the cornea 2, the well-known ring illumination method is employed.

First the method of the ring illumination will be described. A ring-shaped aperture [P$_1$] is provided at a position P$_1$ (See FIGS. 1 and 2) of the illumination optical system in real conjugated relation with the cornea 2. Therefore, the illumination light passing through the cornea 2 may be limited to a ring portion [P$_1'$] (See FIG. 3) which is geometrically conjugated with the ring [P1], so that reflected light occurs only at the ring portion [P$_1'$]. In order to prevent this reflected light, a sufficiently large circular aperture [H] is provided at the position H in the photographic optical system and in real conjugated relation with the cornea 2 to thereby interrupt the real image of the ring portion [P$_1'$], so that the light flux which passes freely through the circular aperture [H] is ensured not to include any light reflected from the cornea 2.

Next the method of the present invention for preventing the light from being reflected upon the front and back surfaces $a$ and $b$ of the first objective lens 3 will be described. Upon the upper surface P$_2$ of the second condenser lens 8 is desposed a small black dot [P$_2$] in order to shield a small the lens 8 about the optical axis of the lens 8 (FIG. 2). The conjugated relation of this small black point upon which is based the present invention will be described in order to explain the interrelation among the optical parts or components described above including the black point.

When an arbitrary object positioned at the point P$_2$ is focused by the illumination light and its partially reflected light, the conjugated relation is determined in the following manner. That is, the light which is emanated from the point P$_2$ and passes through the third condenser lens 9 and the planar reflecting mirror M is once focused in the vicinity of the vertex of the back surface $b$ of the first objective lens 3, thereby forming an intermediate image P'. A portion of the light is reflected by the surface $b$ and directed toward the aperture stop H (This reflected light will be referred to as "$b$-reflected light" hereinafter). The remaining light not reflected upon the surface $b$ is refracted at the surface $b$ and reaches the surface $a$, where a portion of the light thereof is reflected and then refracted at the $b$-surface, thus reaching the aperture stop H and forming the real image of P$_2$. (This will be referred to as "$a$-reflected light" hereinafter.) The reflected light which adversely affects the ophthalmosopic photography is of course "$a$- and $b$-reflected light." (See dotted lines in FIG. 3.)

When the $b$-surface is convex, among the $b$-reflected reflected light, the light flux which can freely pass through the aperture H is that which is reflected from the limited area in the vicinity of the vertex of the $b$-surface so that the black point [P$_2$] is provided at the point P$_2$ thereby preventing the reflection, thereby attaining indirectly the shielding performance.

Let 2Z be the diameter of the intermediate image [P$_b'$] of [P$_2$] upon the $b$-surface required for the indirect shielding, then Z may be obtained by the following relation by the law of reflection:

$$Z \approx R/2(x/L_H + y/L_P)$$

where $R$ = the radius of curvature of the vertex of the $b$-surface;

$2x$ = diameter of the aperture H;

$2y$ = the maximum diameter of the ring-shaped aperture stop [P$_1$];

$L_H$ and $L_P$ = distances from the center of curvature C of the $b$-surface to H and P$_1$, respectively, and in practice, $L_H$=

$L_P$, but for the sake of clear explanation different characters are used. (See FIG. 4.)

As to the $a$-reflected light, it will be understood that the conjugated real image of the black point $[P_2]$ is superposed upon the aperture stop H because of the above-described conjugated relation. Therefore, this image must be sufficient enough to shield the aperture [H] of the aperture stop H.

In this embodiment the black point $[P_2]$ and the ring-shaped aperture stop $[P_1]$ have been described as being formed upon the upper surfaces of the second and third condenser lenses 8 and 9 respectively, but their positions may be displaced if desired based upon the principle of the present invention described herein.

From the foregoing, it will be understood that the present invention can form a very clear, sharp image of the fundus of an eye to be examined because undersired light (which adversely affects the photography) reflected by the cornea and the curved surface of the first objective lens can be completely eliminated.

What I claim is:

1. A device for the photography of a fundus, particularly a retina of an eye, comprising, a main optical viewing system including a bi-convex photographic objective placed on an optical axis of the eye for forming an intermediate image of the retina, and an aperture stop placed at a position conjugate with the cornea of the eye with respect to the photographic objective; an illuminating system comprising a light source and an illuminating optical arrangement for projecting an image of said light source on the cornea of the eye sequentially including said photographic objective, and apertured inclined mirror placed between said photographic objective and said aperture stop for reflecting the illuminating light rays toward the optical axis of said objective and an optical system, whereby the optical axis of said optical system is arranged transversely to the axis of said photographic objective, said mirror is centrally positioned with respect to both the viewing system and optical system axes; said optical system further including first condenser lens proximate said light source followed by first and second positive lens means, a ring-shaped aperture having a central obscuring portion, said ring-shaped aperture being provided on a surface of said second positive lens means and positioned with respect to said photographic objective and said photographic objective and said inclined mirror to produce an intermediate image of said ring aperture in substantial coincidence with said cornea, a center obscuring spot diaphragm placed on the optical axis of said optical system between said light source and said ring aperture, said spot diaphragm being provided on a surface of said first positive lens means with the lens elements of said illuminating optical arrangement so positioned as to form an intermediate image of said spot diaphragm on the rear surface of said photographic objective, whereby the curvature of the objective acts as a convex mirror for further forming said intermediate image of said spot diaphragm on said aperture stop.

2. A device according to claim 1, wherein said first positive lens means is a planoconvex lens, said spot diaphragm being provided on the plane surface of said first positive lens means, said and said ring aperture being provided on the plane surface of said second positive lens means.

UNITED STATES PATENT OFFICE
CERTIFICATE OF CORRECTION

Patent No.  3,594,071            Dated  July 20th, 1971

Inventor(s)  Hirokazu Okajima

It is certified that error appears in the above-identified patent and that said Letters Patent are hereby corrected as shown below:
(COUNTING FROM LINE 1 IN THE RESPECTIVE COLUMN AND WITHOUT REFERENCE TO THE LINE NUMBERS APPEARING BETWEEN THE COLUMNS WHICH ARE OUT OF PHASE WITH THE LINES)

Column 2, line 29, change "the lens 8" to -- portion --; line 53, change "theb" to -- the b --; line 56, change "theb" to -- the b --; line 61, change "theb" to -- the b --. Column 4, line 28, after "said", insert -- second positive lens means is a plano-convex lens --.

Signed and sealed this 18th day of April 1972.

(SEAL)
Attest:

EDWARD M.FLETCHER,JR.                ROBERT GOTTSCHALK
Attesting Officer                    Commissioner of Patents